Figure 1:
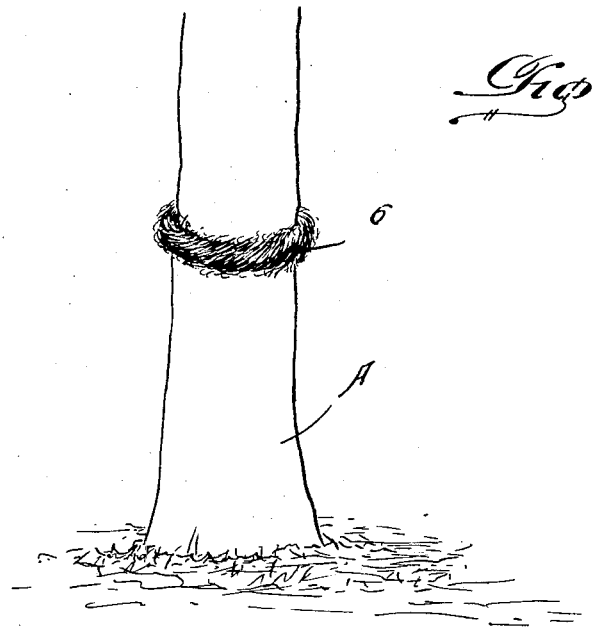

Oct. 29, 1929.  P. MÖRK  1,733,233
TREE PROTECTOR
Original Filed Feb. 8, 1928

Inventor
Paul Mork,

By Clarence A. O'Brien
Attorney

Patented Oct. 29, 1929

1,733,233

UNITED STATES PATENT OFFICE

PAUL MÖRK, OF SUTTONS BAY, MICHIGAN

TREE PROTECTOR

Application filed February 8, 1928, Serial No. 252,825. Renewed May 31, 1929.

This invention relates to new and useful improvements in means for protecting trees from worms and insects that climb the trunks of the trees and eventually reach the leaves and fruit, frequently damaging the entire crop, and in a number of instances entirely killing the tree.

Certain patents have been granted on protecting means for rapid engagement around the trunk of a tree such as paper having a sticky substance applied thereto and lengths of cotton batting adapted to be wrapped around the tree.

The first mentioned means is useless after a wind storm for the reason that the sticky substance will become filled with dirt while a heavy rain will so soak the cotton batting as to make it useless.

In carrying out the present invention there is provided a length of wire covered with wool, and in actual practice it is only necessary to cut a predetermined length of the wool covered wire whereupon the same may be easily engaged around the trunk of a tree and the ends of the wire joined together.

It is well known that wool is the best material for preventing bugs and insects from climbing the trunk of a tree. However, it is usually necessary to tie the wool on the tree with a string. However, this is a long and tedious practice and in most instances a rain or wind storm will blow the wool from the tree. However, by reason of the wool being arranged around the wire there will be little or no liability of the same becoming displaced from the tree.

Figure 2:
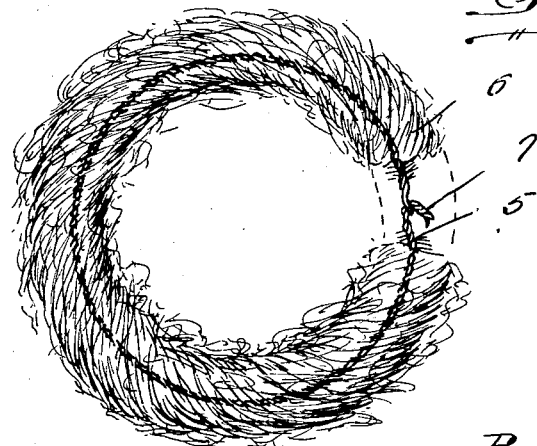

In the drawing:

Figure 1 is an elevation of a tree trunk around which is engaged a length of the wool covered wire, and Figure 2 is a plan view of the length of the material bent into circular shape, the wool at the ends of the length of wire being broken away.

Now having particular reference to the drawing, my novel invention consists of a predetermined length of double strand wire 5, the strands being twisted together as disclosed in Figure 2. Before the twisting action the wool 6 is arranged between the strands so as to be tightly joined to the wire after the strands have been twisted.

Preferably a great length of this double strand wool carrying wire is provided, and these great lengths of wire may be sold by the reel so that a suitable short length can be cut therefrom and the length engaged around the trunk of a tree A as in Figure 1 after which the ends of the short length may be joined together by twisting or the like as indicated by the reference character 7 in Figure 2.

It will thus be seen that there will be little or no possibility of the wool becoming detached from the tree and a number of methods may be followed whereby the wool may be so applied to the wire as to negative any liability of the wool being blown from the wire.

Having thus described the invention, what I claim as new and desire to secure by Letters Patent is:—

1. In a tree protecting means of the character described, a predetermined length of wire adapted to be engage around the trunk of a tree after which the ends may be joined together and a covering of wool upon said length of wire.

2. In a tree protecting means of the character described, a predetermined length of ductile material adapted to be bent around a tree trunk and to be secured thereto and a covering of wool for said ductile material.

3. In a tree protector comprising a pair of strand lengths of ductile material, a quantity of wool, said wool being disposed between said strand lengths and secured thereto by twisting said strands.

In testimony whereof I affix my signature.

PAUL MÖRK.